No. 821,554. PATENTED MAY 22, 1906.
Z. L. TRUESDELL.
CENTRIFUGAL CREAM SEPARATOR.
APPLICATION FILED JULY 6, 1905.
2 SHEETS—SHEET 1.
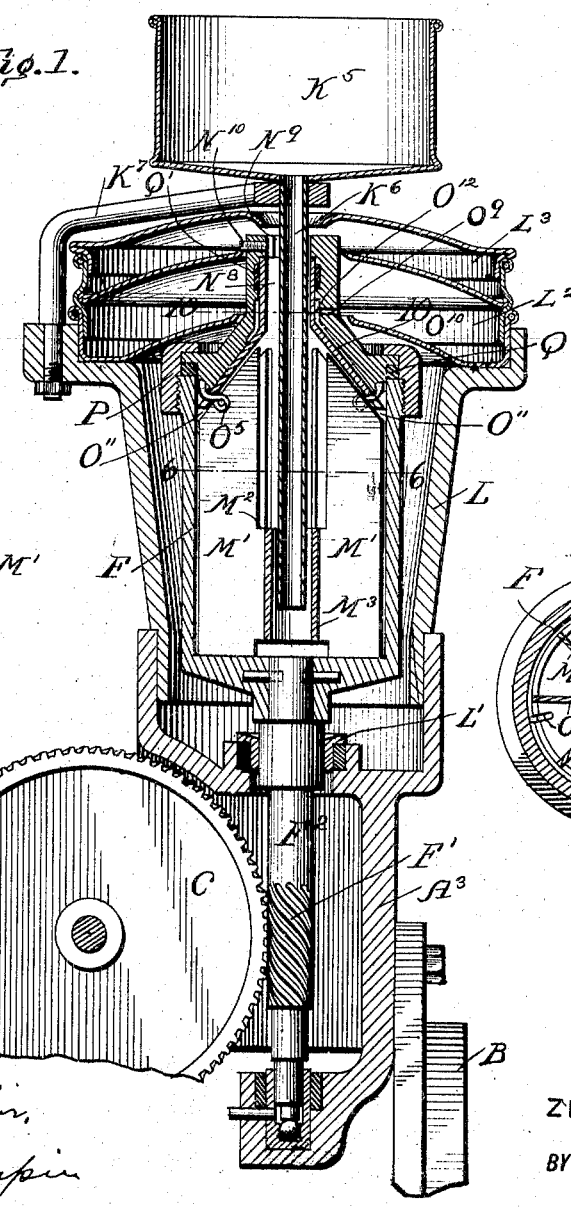
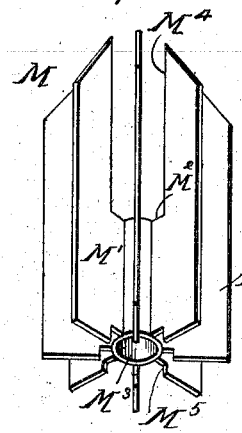
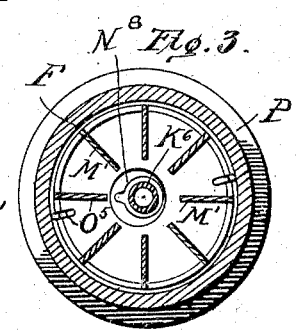
WITNESSES:
INVENTOR
ZINA L. TRUESDELL.
BY
ATTORNEYS No. 821,554. PATENTED MAY 22, 1906.
Z. L. TRUESDELL.
CENTRIFUGAL CREAM SEPARATOR.
APPLICATION FILED JULY 6, 1905.

2 SHEETS—SHEET 2.

WITNESSES:
W. R. Taylor
Perry B. Turpin

INVENTOR
ZINA L. TRUESDELL.
BY Munn & Co.
ATTORNEYS

UNITED STATES PATENT OFFICE.

ZINA L. TRUESDELL, OF CAMDEN, INDIANA.

CENTRIFUGAL CREAM-SEPARATOR.

No. 821,554.  Specification of Letters Patent.  Patented May 22, 1906.

Application filed July 6, 1905. Serial No. 268,366.

*To all whom it may concern:*

Be it known that I, ZINA L. TRUESDELL, a citizen of the United States, and a resident of Camden, in the county of Carroll and State of Indiana, have made certain new and useful Improvements in Cream-Separators, of which the following is a specification.

My invention is an improvement in cream-separators, and particularly in centrifugal separators; and the invention consists in certain novel constructions and combinations of parts, as will be hereinafter described and claimed.

Figure 4:
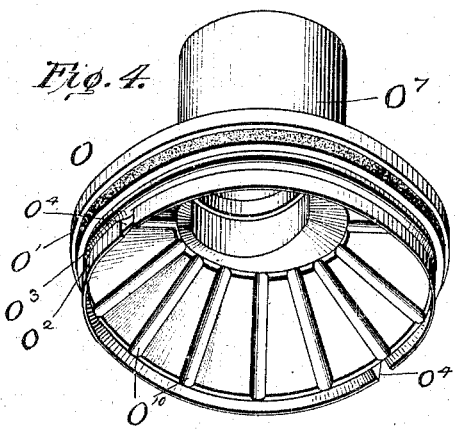
Figure 5:
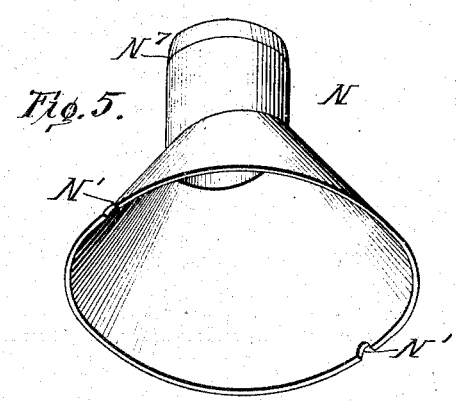
Figure 6:
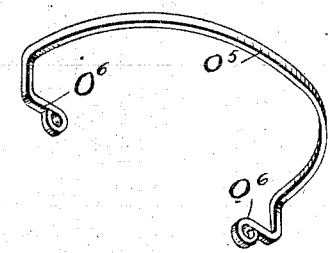
Figure 7:
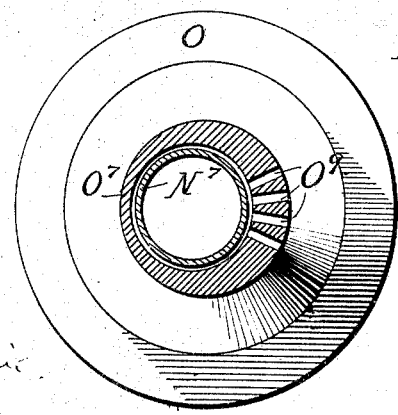

In the drawings, Figure 1 is a partial vertical longitudinal section of the machine. Fig. 2 is a detail perspective view of the bladed carrier. Fig. 3 is a cross-section on about line 6 6 of Fig. 1. Fig. 4 is a detail perspective view of the outer section of the skimmer-cone. Fig. 5 is a detail perspective view of the inner section of the skimmer-cone. Fig. 6 is a detail perspective view of the spring-fastening for securing said sections together. Fig. 7 is a detail cross-sectional view on about line 10 10 of Fig. 1.

The casing L is mounted upon the main frame $A^3$, mounted on the leg B and having the side plate $A'$, and said casing L is provided at its bottom with a bearing $L'$ for the shaft of the bowl F and suitably supports at its upper end the receptacles $L^2$ and $L^3$, the lower receptacle $L^2$ being designed to receive the skim-milk and the upper receptacle $L^3$ being designed to receive the cream discharged in the operation of the machine.

The bowl F has its shaft $F^2$ suitably journaled and provided with a worm $F'$, meshed by the worm-wheel C, and is in practice given a rapid revolution in the operation of separating the cream from the milk. Within the bowl F, I support the bladed carrier M, (shown in detail in Fig. 2,) whose purpose is to cause the milk in the bowl to turn with the latter. As shown the carrier M comprises a series, usually eight or more, of blades $M'$, provided at their inner edges toward their lower ends with the inwardly-projecting portions $M^2$, secured to the central connecting-tube $M^3$, the latter extending for a portion of the length of the blades and the latter being cut away at $M^4$ above the tube $M^3$ and at $M^5$ below the said tube, the lower cut-away portion $M^5$ permitting the supply of full-milk to pass outwardly below the tube $M^3$ and the upper cut-away portion $M^4$ permitting the cream to accumulate at the inner edge of the wings of the carrier and pass upwardly around but not in contact with the tube $K^6$ to the top of the neck of the bowl.

The skimmer-cone forming a cover for the bowl is composed of the inner section N and the outer section O. The outer section O is flanged at its lower end at $O'$ to rest upon the upper end of the bowl F and be secured by the band P, as shown in Fig. 1, and is provided below the flange $O'$ with a depending tubular portion $O^2$, grooved in its outer face at $O^3$ and provided with the diametrically opposite notches $O^4$, in which the ends of the clasp $O^5$ engage. The inner section N fits within the outer section O and is notched at its lower edge for engagement by the ends of the clasp $O^5$, whereby to secure the sections N and O together, as will be understood from Figs. 1 and 5 of the drawings. In securing the sections N and O together the clasp $O^5$ fits for the major portion of its length in the groove $O^3$ of the section O and its inturned ends $O^6$ engage in the notches $O^4$ and $N'$ of the sections O and N and operate to secure the said sections together, so they can be readily detached, thus facilitating cleansing the parts, as is highly desirable in this class of inventions.

The inner and outer sections N and O of the skimmer-cone are made conical and are provided at their upper ends with the tubular necks $N^7$ and $O^7$, fitting one within the other and having their bores eccentric to the center of motion of the bowl in order to secure a separate discharge of the skim-milk and cream in such manner as to avoid the formation of a current or currents by which to deflect the milk and cream both to a single outlet. This eccentric arrangement of the bores of the necks $N^7$ and $O^7$, as best shown in Figs. 1, 4, 5, and 7, and by which I secure at $N^8$ within the neck $N^7$ a comparatively large open space to one side of the feed-tube $K^6$, within which the cream may pass upwardly to its outlet $N^9$, the latter being arranged for regulation by a screw $N^{10}$ and being located the same distance from the center of motion of the bowl as the outlet $O^9$ for the skim-milk, this being desirable, as is well understood by those skilled in the art. In securing the passage of the skim-milk to the outlet $O^9$, I prefer to make the outer section O with the longitudinal grooves or channels $O^{10}$ closed at their inner sides by the fitting of the section N within the section O and forming a series of passages through which the skim-milk travels from a point O¹¹ at the lower edge of the section O upwardly to the annular space O¹², surrounding the neck N⁷ of the inner section N and with which the discharge-outlet O⁹ for the skim-milk communicates, as will be understood from Figs. 1, and 7 of the drawings. Suitable packing-gaskets may be provided at Q and Q', as best shown in Fig. 1 of the drawings. This eccentric arrangement of the bores of the necks O⁷ and N⁷ enables me to provide in a simple and efficient manner for the separate discharge of the milk and cream at the same distance from the center of motion of the bowl without in any way interfering with a thorough cleansing of the sections of the cover when detached, as before described. A feed-cup K⁵, supported by a bracket K⁷ from the bowl-casing L, may by its depending tube K⁶ feed the full-milk to the bowl.

In practice I prefer to make the bowl F and its skimmer-cone of aluminium, and any other suitable material may be employed in manufacturing other parts of the device.

In operation as the bowl is rapidly revolved by the means before described the full-milk is fed from the feed-cup down through the tube and discharged within and through the tube M³ of the winged carrier and caught by its lower ends M⁵ and distributed between the wings of the carrier and enables the full centrifugal force to act on the milk immediately on its being caught by the carrier, and as there is continuous inflow the separated particles gradually flow toward the outlets with nothing to retard the upward movement, so they will keep up with the travel of the bowl, thereby enabling the use of a bowl of smaller diameter and of less length, so that the entire apparatus will be easier to run and to clean. Thus the separation of the milk and cream is effected by the centrifugal action, the heavier particles circulating outward and passing upward between the inner and outer sections to be discharged at O⁹, while the lighter or cream particles accumulate toward the center of the bowl and pass upwardly, surrounding the feed-tube, but not in contact with it, and into the eccentric bore of the inner section N and thence out of the discharge N⁹, being controlled by the screw-valve, as before described.

Having thus described my invention, what I claim as new, and desire to secure by Letters Patent, is—

1. The combination substantially as herein described of the bowl-casing, receptacles at the upper end thereof for the skim-milk and cream, the bowl operating within said casing, the bladed carrier within the bowl and comprising the blades and the central tube to which said blades are secured near their lower ends, the blades being cut away at their inner portions above the said tube, the skimmer-cone composed of the inner and outer sections, the outer section being provided with a lateral flange to rest upon the bowl and below the same with a tubular extension fitting within the bowl and provided in its outer side with a circumferential groove and with notches intersecting the same and said section being provided in its inner face with the longitudinal grooves or channels and at its upper end with the upwardly-projecting neck whose bore is eccentric to the bowl and provided at its upper end with the cream outlet or discharge and at its lower end with an outlet for skim-milk, the inner cover-section fitting within the outer section and closing the inner sides of the longitudinal channels therein and provided at its upper end with a neck projecting into that of the outer section and having its bore eccentric to the bowl and approximately concentric with the eccentric bore of the neck of the outer section and communicating on its longest side with the cream-outlet in the outer section, the spring-clasp engaging in the groove of the outer section and at its ends in the notches of the inner and outer sections and securing said sections detachably together, and a feed-tube discharging into the central tube of the bladed carrier, substantially as and for the purposes set forth.

2. In a centrifugal cream-separator a skimmer-cone composed of inner and outer sections having between them channels for the passage of skim-milk and provided at their upper ends with upwardly-projecting necks fitting one within the other and having their bores eccentrically disposed, the longer side of the bore of the inner neck forming a passage for the separated cream, substantially as set forth.

3. In a cream-separator a skimmer-cone composed of inner and outer sections fitting one within the other, the outer section being provided with longitudinal channels for the passage of skim-milk and with an outlet for said skim-milk, the inner section fitting within the outer section and closing the inner sides of said channels and having at its upper end a neck provided with a passage for the cream and a spring-clasp securing said sections detachably together substantially as set forth.

4. The combination of the outer skimmer-cone section provided at its lower end with a depending flange grooved in its outer side and having notches intersecting said groove, the inner section fitting in the outer section and having in its lower end notches registering with those in the depending tube of the outer section and the spring-clasp fitting in the groove of the outer section and having its ends arranged to engage in the notches of the inner and outer sections whereby to unite said sections and to hold same from turning independently of each other, substantially as set forth.

5. The combination of the bowl, the skimmer-cone having the upwardly-projecting neck arranged eccentric to the center of motion of the bowl and the feed-tube extending through said neck into the bowl and arranged concentric with the latter, substantially as set forth.

6. In a cream-separator the combination of the bowl, the skimmer-cone having means for discharging the skim-milk and cream, and a winged carrier operating in the bowl and having a series of blades and a central tube to which the said blades are secured at their inner edges, the blades being cut away on their inner edges above the tube to permit the cream to accumulate at the center of the carrier, the tube terminating at its lower end above the lower ends of the blades to permit the discharge of the milk at the bottom of the carrier, substantially as set forth.

7. The combination of the separator-bowl and the skimmer-cone composed of outer and inner sections fitting upon the bowl, longitudinal channels being provided between said sections and the said sections being provided at their upper ends with upwardly-projecting necks whose bores are concentric with each other and eccentric to the center of motion of the bowl, the outer section being provided with an outlet for the skim-milk and the inner section affording at the longer side of its bore a passage for the cream, substantially as and for the purpose set forth.

8. The combination in an apparatus substantially as described of the bowl, a skimmer-cone fitted thereon and composed of inner and outer sections having between them channels for the passage of skimmed milk and provided at their upper ends with upwardly-projecting necks fitting one within the other, the bore of the inner neck being eccentric to the bowl and a feed-tube extending through said bore and arranged concentrically with the bowl whereby a passage on the long side of the said bore will be provided alongside the concentrically-disposed feed-tube, substantially as set forth.

9. A centrifugally-operating separating-bowl having a skimmer-cone composed of inner and outer sections and provided with a neck whose interior or bore is eccentric to the bowl whereby the longer side of said bore will afford a passage alongside a feed-tube disposed concentrically to the bowl, substantially as set forth.

ZINA L. TRUESDELL.

Witnesses:
SOLON C. KEMON,
PERRY B. TURPIN.